(12) United States Patent
Hsu et al.

(10) Patent No.: US 8,751,205 B2
(45) Date of Patent: Jun. 10, 2014

(54) GENERATING DISCRETE EVENT SIMULATION DATA

(75) Inventors: Meichun Hsu, Los Altos Hills, CA (US);
Qiming Chen, Cupertino, CA (US); Bin Zhang, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 400 days.

(21) Appl. No.: 13/172,553

(22) Filed: Jun. 29, 2011

(65) Prior Publication Data

US 2013/0006596 A1 Jan. 3, 2013

(51) Int. Cl.
*G06G 7/48* (2006.01)

(52) U.S. Cl.
USPC .......................................................... 703/6

(58) Field of Classification Search
CPC .................................. G06F 17/30; G06F 17/50
USPC .......................................................... 703/6
See application file for complete search history.

(56) References Cited

U.S. PATENT DOCUMENTS

| | | | |
|---|---|---|---|
| 7,103,590 B1 | 9/2006 | Murthy et al. | |
| 7,519,865 B1 * | 4/2009 | Maly et al. | 714/33 |
| 7,822,629 B2 | 10/2010 | Chen et al. | |
| 2003/0229900 A1 * | 12/2003 | Reisman | 725/87 |
| 2004/0117325 A1 * | 6/2004 | Cash et al. | 705/401 |
| 2005/0097078 A1 | 5/2005 | Lohman et al. | |
| 2007/0288212 A1 | 12/2007 | Messmer et al. | |
| 2010/0106946 A1 | 4/2010 | Imaki et al. | |

OTHER PUBLICATIONS

Hui Ding, NPL, "Efficient Maintenance of continuous queries for trajectories", 2007, Springer.*
Jason Liu, NPL, "Parallel discrete event simulation", 2009.*
Liu, Jason, Parallel Discrete-Event Simulation, published Feb. 9, 2009, pp. 1-20, found at liux©cis.fiu.edu, School of Computing and Information Sciences, Florida International University, Miami, Florida 33199.

* cited by examiner

*Primary Examiner* — Omar Fernandez Rivas
*Assistant Examiner* — Angel Calle

(57) ABSTRACT

A method of generating discrete event simulation data using a query is provided herein. The method includes retrieving a trajectory specifying a service access event for a customer accessing a service in a simulation. The method also includes processing, in a relational database query, one or more pending events corresponding to one or more customers accessing the service before the customer. Additionally, the method includes processing, in the relational database query, the service access event. Processing the service access event occurs after processing the one or more pending events. The method also includes providing a result for the relational database query. The result comprises the trajectory, and the one or more trajectories.

20 Claims, 7 Drawing Sheets

100

200

300

400

500

600

700

GENERATING DISCRETE EVENT SIMULATION DATA

BACKGROUND

In discrete event simulation, an organization's processing efficiency may be simulated and analyzed. For example, a bank providing multiple services may have lines of customers waiting for each of those services. Some customers may use only one service. Other customers may use multiple services. The route of each customer that uses multiple services may vary. By simulating the bank's processing of their customers, useful information may be derived that may be used to improve the organization's efficiency, customer satisfaction, etc. For example, simulation may be useful to diagnose an organization's operations, identify bottlenecks, and understand key performance indicators (KPIs) of a system. KPIs include worker utilization, on-time delivery rate, customer waiting time, etc. Typically, discrete event simulation systems are hand-coded, with various implementations in the C programming language. However, the use of hand-coded programming languages becomes computationally expensive for larger simulations.

BRIEF DESCRIPTION OF THE DRAWINGS

Certain examples are described in the following detailed description and in reference to the drawings, in which.

DETAILED DESCRIPTION

In one example, discrete event simulation data may be generated using a relational query language, such as the structured query language (SQL). Relational languages such as SQL are high-level, specification-based languages, providing advantages, such as expressive power, and data manipulation functionality. Further, SQL's query evaluation process may be used to naturally serialize concurrent event handling, such as discrete event simulation.

Introduction

Customer trajectories to multiple services may be generated by a single query run. However, using SQL query to generate discrete event simulation data is challenging because discrete event simulation is a concurrent operation. For example, deriving waiting times depends on how many other customers enter a queue before this customer. Accordingly, deriving waiting times is performed concurrently with simulating each customer's movement through each queue. Typically, such systems represent each customer's trajectory through the system as a chronological sequence of events. Each event occurs at an instant in time and marks a change of state in the system.

Framework and Challenges in Query-Based Discrete Event Simulation

Another characteristic of simulation systems is that, as a result of processing primary events, pending events may be created. Event propagation may be further chained, resulting in successive pending events. Due to this characteristic, it is challenging to include primary and pending events in a result set because SQL queries are set-wise operations, limited to processing a current state. When pending events representing a future state are generated, there is no way to "insert" them back to the input stream for processing within a chronological sequence. Further, it may be computationally complex to associate a "clock" with query processing. SQL's expressive power for high-level specification and data manipulation may be used to produce an entire chronological sequence of initial events, as well as subsequently resulted events, in a single query.

Figure 1:
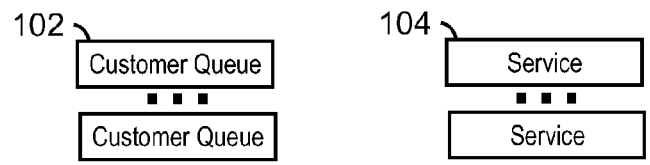
FIG. 1 is a block diagram of a discrete event simulation in accordance with an example.

Handling concurrent operations on both past events and pending events with set-wise, history, insensitive queries implicates a number of challenges. An example of the challenges is described with reference to FIG. 1, which is a block diagram of a discrete event simulation 100 in accordance with an example. The discrete event simulation 100 includes several customer queues 102 at each of several services 104. For example, the queues 102 may represent lines at a bank, where each of the services 104 represents a bank teller, providing the service 104. In an example, the simulation 100 may simulate the processing of customers through bank lines.

The simulation 100 may include a series of events. The events 106 may be represented as variables for each customer, such as a customer-arrival time and a customer-departure time. The simulation 100, at any point in time may be described as a system state. The system state may be changed by the events. The system state may be represented in variables for each of the services 104. The variables may include, for example, number-of-customers-in-the-queue (integer) and teller-status ("busy" or "idle"). The simulation 100 may also make use of random variables, which are used to model the simulation stochastically. Random variables may include, for example, customer-interarrival time and teller-service time. The customer-interarrival time may represent the time that at customer arrives at a particular queue 102, as distinguished from a customer-arrival time, which may represent when the customer arrives at the bank, for example.

In one example, the simulation 100 may be performed in a database management system (DBMS). In such an example, a fixpoint mechanism may be used to generate discrete event simulation data by recursively evaluating a SQL query. A query may be recursively applied to its last result, the fixpoint, with no new results generated. With this mechanism, an entire chronological sequence of events may be processed in a single query evaluation. Pending and primary events may be serialized using pipelined query processing. A user defined function generates event records. Pipelines are formed by cutting subsequent event generation to the current event time. In other words, all the processing applied to an event as the customer moves through the simulation, is merely performed for events, primary and pending, that occur at the time of the currently processed event. In this way, each input event, together with all previously generated pending events, are processed in the per-tuple processing of SQL.

Figure 2:
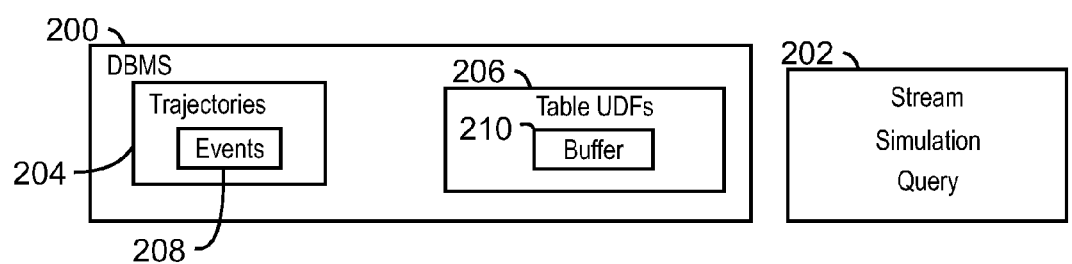
FIG. 2 is a block diagram of a DBMS and a query, in accordance with an example.

FIG. 2 is a block diagram of a DBMS 200 and a stream simulation query 202, in accordance with an example. The stream simulation query 202 may be configured to generate discrete event simulation data in a database table, shown as trajectories 204. The trajectories 204 include events 208 for each customer in the simulation 100. The stream simulation query 202 also makes use of table user defined functions (UDFs) 206. The table UDFs 206 may include buffers 210. Buffers 210 are described in greater detail with respect to FIG. 7. The stream simulation query 202 generates the trajectories 204 of customers accessing services 104.

The trajectories 204 may represent the experience of a customer in accessing the services 104. In one example, the trajectories 204 may be represented in a customer tracking record (CTR). A CTR is filled with attribute values, recorded step-by-step, during the simulation 100. The CTR may include information regarding the customer's route, with arrival and departure times. For example, the CTR, in a simulation with services A, B, and C, includes the following attributes: [customer ID, time, plan ID, nextService, arriveA, departA, arriveB, departB, arriveC, departC]. A CTR, such as shown, enables the extraction of events 208.

The customer ID may be a unique identifier for each customer. The attribute, time, may be the next possible time that a pending event may occur. For example, if the customer's nextService is service A, and the time is 9:30, the customer may not arrive at the queue for service A until 9:30.

With regard to the plan ID, there exist numerous possible routes for each customer, depending on the number of available services. In this example, there are 15 possible routes for a customer to access the services A, B, C. Routes include, <A>, <A, C>, <C, A>, <B, C, A>, . . . etc. Each of these possible routes is referred to as a routing plan. Each routing plan may be assigned an integer. The routing plan for the customer may accordingly be represented in the CTR. The nextService may represent the next service 104 that the customer accesses during a particular state of the simulation 100. The attributes, arriveA, departA, etc., may include times of arrival and departure for the customer at the respective service queues.

For customers having accessed all the services 104, a completed CTR may have all the service specific arrival and departure times populated. Completed CTRs may also have 0 or null values in the time and nextService attributes. A customer whose routing plan is limited to accessing service B may have the following completed CTR: [6, 0, 2, NULL, 0, 0, '9:30', '9:45', 0, 0]. In one example, the CTR may be updated during the query processing until completed. In this way, all the events associated with a customer are encapsulated in the customer's CTR. A CTR can be viewed as a composite event. By analyzing events specific to each service, metrics such as the average waiting time distribution over time periods, may be easily derived from CTRs using SQL.

Initial Simulation Data Generation

The initial CTRs may be generated by a table UDF 206. Another table UDF 206 may generate a chronological sequence of events with random intervals. The stream simulation query 202 may use a function scan, rather than a table scan, as its access method. In this way, input data may be returned by the table UDF 206. Although a query operation is set-oriented, the query evaluation may be tuple-by-tuple pipelined. As such, the process of query evaluation is used to serialization events in the simulation 100. The states describing both past events and pending events may be kept and updated in the table UDFs 206. Future states, e.g., an expected customer departure, may be calculated in the UDF 206 as well.

One of the table UDFs 206, may be invoked with a call, such as init_evt (k, s, n), where k, s, and n represent 3 parameters. The k parameter may be the range used to calculate service intervals at each service 104. A random number generator may compute intervals of time that each customer spends at a particular service. Based on these random intervals, the customers move through the queues 102 at their various times. The k parameter may set an upper bound on the amount of time spent in an interval. The s parameter may be the total time coverage of the simulation 100. The n parameter may be the start time of the simulation. For example, a call, init_evt (5, 420, 540), generates initial events for a simulation period covering 7 hours (420 minutes), and starting at 9 A.M. (at 540 minutes after midnight). Time intervals between each event are selected randomly within a 5-minute boundary. The initial event may be, for example, customers arriving at a bank for the time the bank is open, from 9 A.M. until 4 P.M.

The init_evt( ) may generate CTRs for each customer in the simulation 100. To populate the CTRs, the init_evt( ) may generate customer ID's for each customer. The customer ID's may be a sequence of natural numbers. The init_evt( ) may also assign a routing plan to each customer. This may be done randomly, or by hashing the customer ID. The CTR may be further with the routing plan ID, next service ID and the corresponding arrival time for the first service. In a scenario where C is the first service in the customer's routing plan, the initial CTR may include [5, '9:30', 6, 'C', 0, 0, 0, 0, 0, 0]. It should be noted that at the initial state of the simulation 100, the next possible event is the customer's arrival at the first service in its routing plan. Accordingly, this CTR instance with a time of 9:30, indicates that customer 5 is to arrive at the customer queue for service C at 9:30. As such, as the simulation 100 progresses, the arriveC time may be populated with the value, 9:30. The CTR may be stored in the trajectories 204. The initial customer trajectory table can be loaded by a query using the init_evt( ) as shown in SQL 1.

SQL 1
INSERT INTO trajectories SELECT * FROM init_event(5, 420, 540);

The trajectories 204 may include various attributes. For simplicity, one attribute, ctr, is described herein. Thus for example, the custID and nextService can be retrieved by SQL 2.

SQL 2
SELECT ctr.customerID, ctr.nextService from trajectories;

Accordingly, the state of the simulation 100 can be derived from CTRs. One of the UDFs 206 may be a scalar UDF, invoked with a call, such as get_svc( ). The input may be a tuple from the trajectories 204, e.g., the CTR tuple, which is of composite type. Using the expressive power of SQL, the input CTRs may be sorted in chronological order, and queried. The output of the get_svc( ) may be the updated CTR tuple, representing a one-step advance of the customer in the simulation 100. When a CTR with an arrival time, t, is input, a random service time $t_s$ is generated, within the given boundary. The departure time for the customer's current service is calculated, as shown in Equation 1:

$$t_d = t_{max} + t_s \quad \text{EQUATION 1}$$

In get_svc( ), $t_{max}$ may be a global variable, containing the departure time of the last customer in the same queue as the current customer. For the first customer in any queue 102, $t_{max}$ may be the start time of the simulation 100. The $t_{max}$ variable may, in turn, be updated to the current $t_d$. The CTRs may then be updated to include an additional step in the simulation 100. In other words, the depart time of the current service, and the arrival time of the next service may be updated to $t_d$. Using CTRs updated this way, events may be projected or derived for analysis of the simulation 100.

Single Stream Simulation

Figure 3:
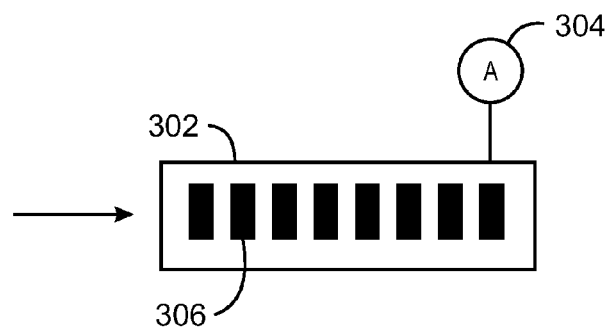
FIG. 3 is a block diagram of a single stream simulation, in accordance with an example.

FIG. 3 is a block diagram of a single stream simulation 300, in accordance with an example. In the single stream simulation 300, there is a single input event stream to the customer queue 302. The trajectories for accessing service 304, service "A," for all customers 306 can be generated by the query shown in SQL 3.

SQL 3
SELECT get_svc( )(T.CTR, 5) FROM (SELECT * FROM TRAJECTORIES ORDER BY CTR.TIME) T;

The functionality of get_svc( ) may be extended to other single stream simulations, such as sequential queues, and forked queues. This may be accomplished by configuring get_svc( ) to work on each input CTR recursively. In this way, when a CTR is filled by one event, the derivation of the next event may become possible.

Figure 4:
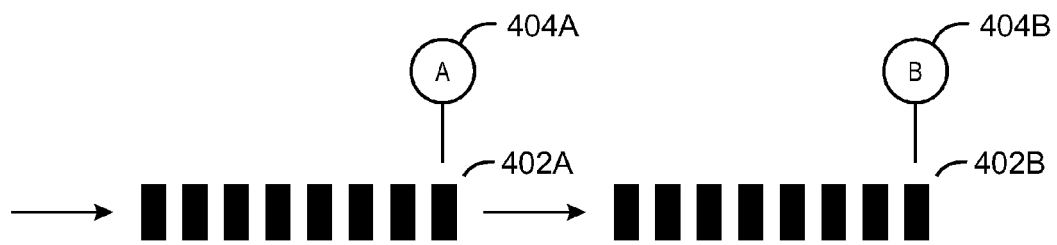
FIG. 4 is a block diagram of a single stream simulation, in accordance with an example.
Figure 5:
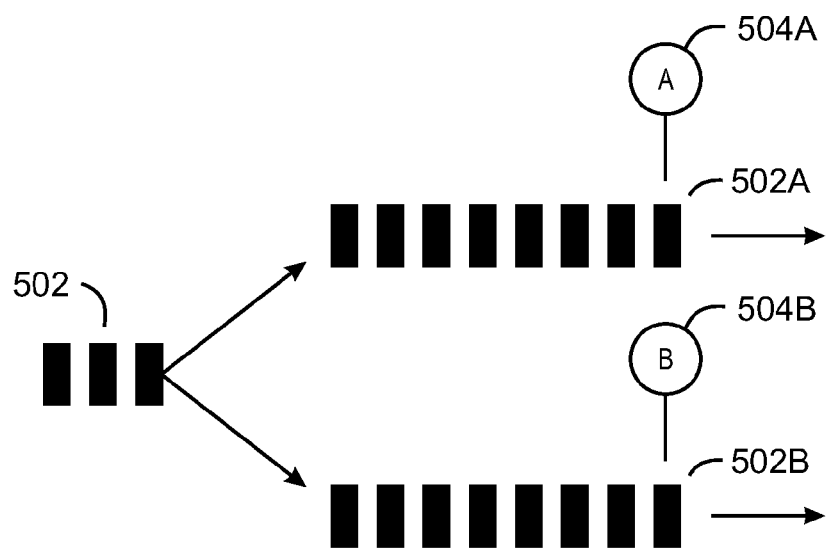
FIG. 5 is a block diagram of a single stream simulation, in accordance with an example.

FIG. 4 is a block diagram of a single stream simulation 400, in accordance with an example. In the single stream simulation 400, all customers first pass through queue 402A for service 404A, then the queue 402B for service 404B, respectively. An SQL similar to SQL 3 may be used to perform the simulation 400. FIG. 5 is a block diagram of a single stream simulation 500, in accordance with an example. In the simulation 500, a single input stream of customers 502 forks to either the queue 502A for service 502A or queue 502B for service 502B. An SQL similar to SQL 3 may be used to perform the simulation 500.

Multi-Stream Simulation

Single stream simulations are limited to handling single event streams to any queue. However, typical simulations are more complex.

Figure 6:
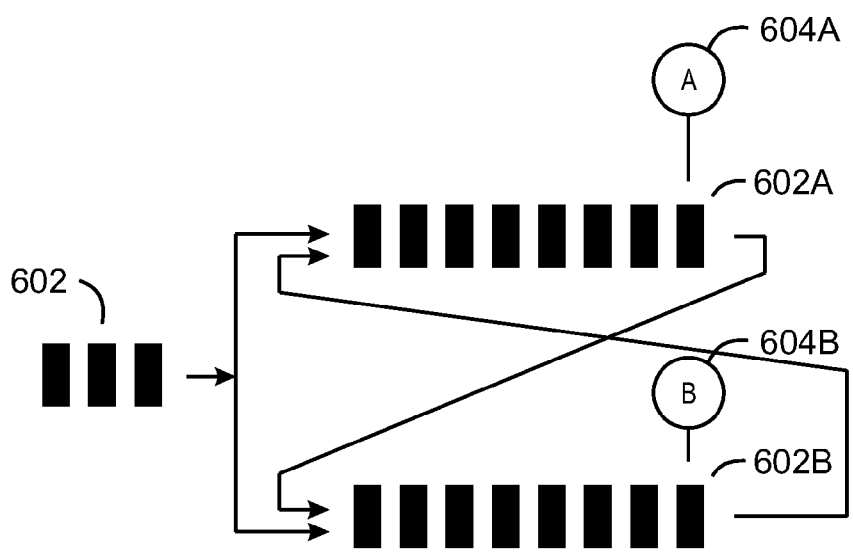
FIG. 6 is a block diagram of a multi-stream simulation, in accordance with an example.

FIG. 6 is a block diagram of a multi-stream simulation 600, in accordance with an example. The simulation 600 includes an input stream of customers 602 to queues 602A and 602B, for services 604A and 604B, respectively. The customers 602 may be hash partitioned according to the following routing plans: access merely service 604A or 604B; access service 604A followed by service 604B; or, access service 604B followed by service 604A.

The simulation 600 generates current events and pending events. For example, the UDF get_svc( ) generates a departure event, by updating the departure time in the CTR for a customer receiving a service 104. However, in the multi-stream simulation 600, the departure event from one queue 602A may implicate a pending arrival event at another queue 602B. The pending arrival event may itself result in subsequent pending events. However, using SQL, the pending arrival event at, for example, queue 602B, cannot be processed until all other arrivals at the queue 602B are determined. More specifically, the departure time of the customer arriving at the queue 602B cannot be determined until the departure times are determined for all the other customers arriving at the queue 602B before the current customer.

SQL Based Fixpoint Method for Discrete Events Simulation

A fixpoint mechanism is used to recursively evaluate a stream simulation query for the simulation 600. Advantageously, the fixpoint mechanism does not generate new results. Additionally, an entire sequence of input CTRs may be processed in a single query evaluation. In one example, pipelined query processing may be used to serialize event processing. A query is evaluated for a set of tuples, whose events and pending events precede the fixpoint time. The fixpoint time may be the event time of a currently processed CTR. In this way, each input event, together with all previous events, and previously generated pending events, may be ensured to be processed up to the fixpoint.

Referring back to FIG. 2, in the stream simulation query 202, both input and output tuples represent CTRs. An execution of the stream simulation query 202 updates the input CTRs based on their routing plans, etc., using the UDFs 206. The complete CTRs are generated from the initial CTRs, $R_0$, by applying the stream simulation query 202 recursively. For a query, Q, a recursive application may be represented as Q( ... Q(Q($R_0$)) ... ) to the fixpoint. Structured in this way, no new results are derivable.

Manipulating CTRs Through Event Processing

The state of a CTR represents the historical and next-step trajectory of a customer, i.e., events 208. These events are readable from and writable to the trajectories 204, and handled in UDFs 206. Events 208 may be based on attributes, such as [customerID, serviceID, timeArrive, timeDepart]. Using events in this way enables the use of event processing to update trajectories 204.

Events may be categorized as primary events and pending events. Events that are included as input CTR tuples are referred to herein as primary events. The events derived as a result of executing the UDFs 206 against the primary events, are referred to as pending events. The arrival of primary events may trigger event processing which derives, as well as back-tracks, the pending events. This mechanism allows us to avoid the difficulty of handling clock in query.

For example, the query 202 applies to each input tuple that represents a primary event $e_t$ with timestamp t; the resulted pending events, if any, are kept in a UDF closure. Such event propagation may be chained as the processing of a pending event $e_p$ may result in another pending event but we have each propagation path "cut" when the timestamp of a resulting event is larger than t.

A primary event may be read from a CTR. Triggered by processing a primary event $e_t$ with timestamp t, the pending events with timestamps earlier than t may be determined. Further, these pending events may be ordered with respect to time and service 604, and processed. The processing of $e_t$ may be consistent if all pending events earlier than t are identified and processed. No event with timestamps earlier than t can be generated from $e_t$. Therefore, in order to process $e_t$, the pending events earlier than t processed. The pending events later than t may be left to a next cycle of the query processing.

As mentioned above, processing pending events is triggered by processing each primary event, e.g., $e_t$ with timestamp t. The processing of a pending event may result in further pending events. Some of these resultant events may also occur before the time threshold of t. To make the processing order of pending events deterministic, a mechanism may be applied in the UDF 206. A total order by time, L, may be created. The order, L may include all existing pending events, which may then be processed from the earliest one, with any further generated pending events, earlier than t, inserted back into L at a position consistent with the time of the pending event. Advantageously, this approach is consistent because for any pending event, $e_p$, no pending event earlier than $e_p$ may be generated by processing $e_p$. Pending events with timestamps later than t may be handled in subsequently processed input tuples, or pushed to a next cycle of the query.

Where events have the same timestamp, a priority order of services may be predefined. Further tiebreakers may extend to fields such as customer ID, etc. In this way, when processing multiple events with the same timestamps, the one with a higher service priority is considered the earlier event. If they have the same service priority, the one with higher customer ID is considered the earlier event, etc. It should be noted that no customer can access more than one service at a time.

Event processing may be handled by a table UDF 206 where both CTRs and pending events are buffered. The CTRs are updated based on primary and pending event processing. Events being processed and CTRs completed may be removed from the buffer. Completed CTRs may also be output from the table UDF 206. At the end of query execution, any remaining CTR may be output from the table UDF 206, to be processed in the next cycle of the same query.

Figure 7:
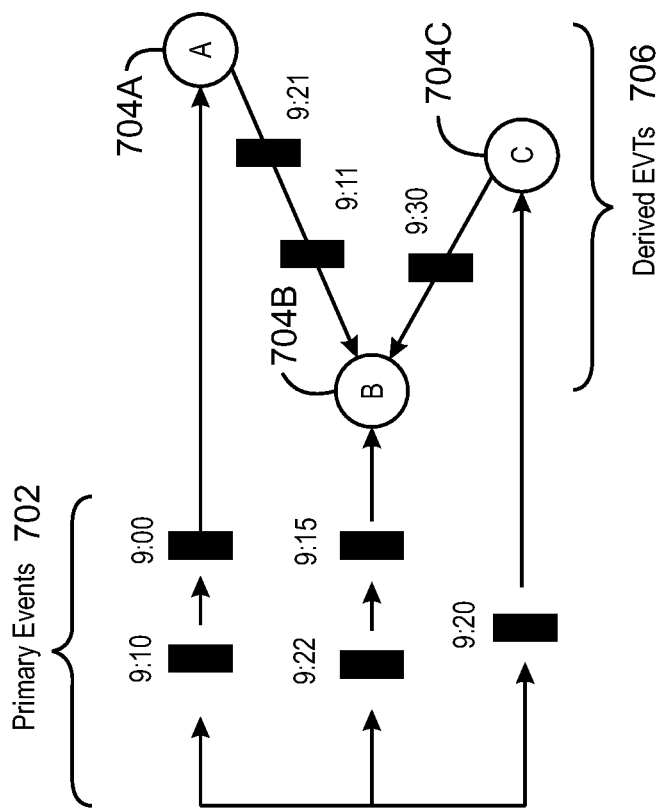
FIG. 7 is a schematic of events in a multi-stream simulation, in accordance with an example.

An example of event processing is described with reference to FIG. 7, which is a diagram of events in a stream simulation 700, in accordance with an example. The stream simulation 700 processes primary events 702, which are represented as time-labeled blocks, and shown approaching the respective services 704A, 704B, and 704C. The primary events 702 represent the arrival of customers at queues for services. For example, two customers arrive at the queue for service 704A: one at 9:00, another at 9:10. In the primary events 702, there are two customers arriving at the queue for service 704B: one at 9:15, another at 9:22. At 9:20, one customer arrives at the queue for service 704C.

Each of the services 704A, 704B, and 704C may be associated with a random number generator for assigning a random service-time within a given range of minutes, to a customer accessing this service. Accordingly, pending events 706 may also be generated for the customers progressing to subsequent services. As shown, from the service 704A, there are two pending events for corresponding customers to arrive at service 704B: one at 9:11, another at 9:21. Similarly, there is one pending event of a customer arriving at service 704B from service 704C, with the customer arriving potentially as early as 9:30. It is noted that these are potential arrival times. The actual arrival times may be later depending on how many other customers enter a queue prior to any particular customer entering the same queue.

In the stream simulation query 202 for the simulation 700, the input CTRs may be ordered by time. A UDF 206, evolve( ), may be a table function with one CTR tuple input as a composite value, i.e., multiple events. Additionally, a set of CTRs may be output. In some cases, the output set may be empty for a particular invocation. Empty output sets may result when no pending events are generated, and no CTRs are completed. As described above, the UDF evolve( ) may buffer input CTRs, primary events read from CTRs, and pending events derived from the primary events. The buffers 208 may also include an events buffer, categorized by service. The UDF evolve( ) may also update the CTR. A random number generator may also be assigned to each service 704A, 704B and 704C, to generate a random service time for a customer arrival event. The UDF evolve( ) may output an unchanged CTR, updated CTR, or nothing in an invocation. In one example, a call, evolve(ctr, buffer) may specify the current CTR to be processed, and a size limit for the CTR buffer. Using the UDF evolve( ) a query for the stream simulation 700 may be written. Referring back to FIG. 2, the stream simulation query 202 may be written as shown in SQL 6.

SQL 6
SELECT evolve(t.ctr, 1000) FROM (SELECT * FROM trajectories ORDER BY ctr.time) t;

All input CTRs may be buffered. If the buffer size reaches the specified limit, the remaining input CTRs may be merely copied to output of the UDF evolve( ). A primary event, $e_t$, with timestamp t, may be read from the input ctr and processed together with the previously buffered derived pending events with timestamps earlier than t. Processing includes updating the CTR with event arrival and event departure times. If a customer has reached the end of a routing plan, the processing includes updating the time and nextService attributes accordingly. If the CTR is complete once the event is processed, the CTR is removed from the buffer and sent to output. Before terminating, the UDF evolve( ) may empty its buffers of any remaining CTRs The remaining CTRs may be processed in the next run of the query. The fixpoint can be easily checked to see whether the query SELECT * FROM trajectories WHERE ctr.time>0; returns NULL. In other words, all the CTRs are complete.

EXAMPLE

In the following discussion, $X_t$ is used to represent customer arrival event to service X at time t. For example, $A_{9:10}$ represents a customer arrival event at service A at 9:10. Table 1 includes input events, processed events, pending events, and buffered events in an execution of SQL 6. The input event represents an event in a CTR. The processed events include all the events processed as a result of the input CTR. The pending events represent the events generated by the processing of the input event. For example, if the customer's routing plan indicates the customer accesses another service, pending arrival event is generated for the next service. The buffered events represent the events remaining in the buffer 208 after the processing of the input event.

TABLE 1

| INPUT EVENT | PROCESSED EVENTS | PENDING EVENTS | BUFFERED EVENTS |
|---|---|---|---|
| $A_{9:00}$ | $A_{9:00}$ | $B_{9:11}$ | $B_{9:11}$ |
| $A_{9:10}$ | $A_{9:10}$ | $B_{9:21}$ | $B_{9:11}, B_{9:21}$ |
| $B_{9:15}$ | $B_{9:11}, B_{9:15}$ | | $B_{9:21}$ |
| $C_{9:20}$ | $C_{9:20}$ | $B_{9:30}$ | $B_{9:21}, B_{9:30}$ |
| $B_{9:22}$ | $B_{9:21}, B_{9:22}$ | | $B_{9:30}$ |

As shown, at the completion of SQL 6, one event remains buffered. This event may be represented in a corresponding CTR stored in the trajectories 204. As such, the SQL 6 may be repeated in a second run. Table 2 represents the second run.

TABLE 2

| INPUT EVENT | PROCESSED EVENTS | PENDING EVENTS | BUFFERED EVENTS |
|---|---|---|---|
| $B_{9:30}$ | $B_{9:30}$ | | |

The CTRs from the simulation 700 are represented in tables 3-5 below. The initial CTRs input to the firsts run are in Table 3. Table 4 includes the updated CTRs resulting from the first run of SQL 6.

TABLE 3

[5, '9:00', 4, 'A', 0, 0, 0, 0, 0, 0]
[6, '9:10', 4, 'A', 0, 0, 0, 0, 0, 0]
[7, '9:15', 2, 'B', 0, 0, 0, 0, 0, 0]
[8, '9:20', 6, 'C', 0, 0, 0, 0, 0, 0]
[9, '9:22', 2, 'B', 0, 0, 0, 0, 0, 0]

TABLE 4

[5, 0, 4, NULL, '9:00', '9:11', '9:11', '9:16', 0, 0]
[6, 0, 4, NULL, '9:10', '9:21', '9:21', '9:26', 0, 0]
[7, 0, 2, NULL, 0, 0, '9:15', '9:20', 0, 0]
[8, '9:30', 6, 'B', 0, 0, '9:30', 0, '9:20', '9:30']
[9, 0, 2, NULL, 0, 0, '9:22', '9:27', 0, 0]

In each run, the non-complete CTRs are input. Table 5 includes the CTRs after the second run of SQL 6. After the second run, the simulation 700 is complete. As shown, all CTRs in Table 5 are complete.

TABLE 5

[5, 0, 4, NULL, '9:00', '9:11', '9:11', '9:16', 0, 0]
[6, 0, 4, NULL, '9:10', '9:21', '9:21', '9:26', 0, 0]
[7, 0, 2, NULL, 0, 0, '9:15', '9:20', 0, 0]
[8, 0, 6, NULL, 0, 0, '9:30', '9:35', '9:20', '9:30']
[9, 0, 2, NULL, 0, 0, '9:22', '9:27', 0, 0]

After the second run, the simulation 700 is completed. Advantageously, this approach is capable of generating discrete event simulation data by using high-level SQL query, with clear semantics. A single query may be run iteratively, wherein an entire set of temporal events (e.g. from 9 am to 4 pm) may be processed. In each run, any incomplete CTR may be evolved at least one step. One optimization involves extracting the completed CTRs from the input of the next run, thereby reducing data load. This may be accomplished with a modified SQL query, such as SQL 7.

SQL 7
SELECT evolve(t.ctr, 1000) FROM (SELECT * FROM trajectories ORDER BY ctr.time) t WHERE t.ctr.time>0;

In one example, a query may be written to run iteratively. In such an example, the trajectories 204 may include an additional integer attribute, e.g. a cycle attribute. The cycle attribute distinguishes CTRs generated in different runs of the query. An example SQL using the cycle attribute is shown in SQL 8.

SQL 8
INSERT INTO trajectories SELECT cycle+1, evolve(t.ctr, 100) FROM (SELECT * FROM trajectories ORDER BY ctr.time) t WHERE t.ctr.time>0 AND cycle=(SELECT MAX (cycle) FROM trajectories);

Using SQL 8, the complete CTRs may be generated in different cycles, but can be easily retrieved by selecting based on the completion conditions, e.g., time=0, or nextService=NULL.

Figure 8:
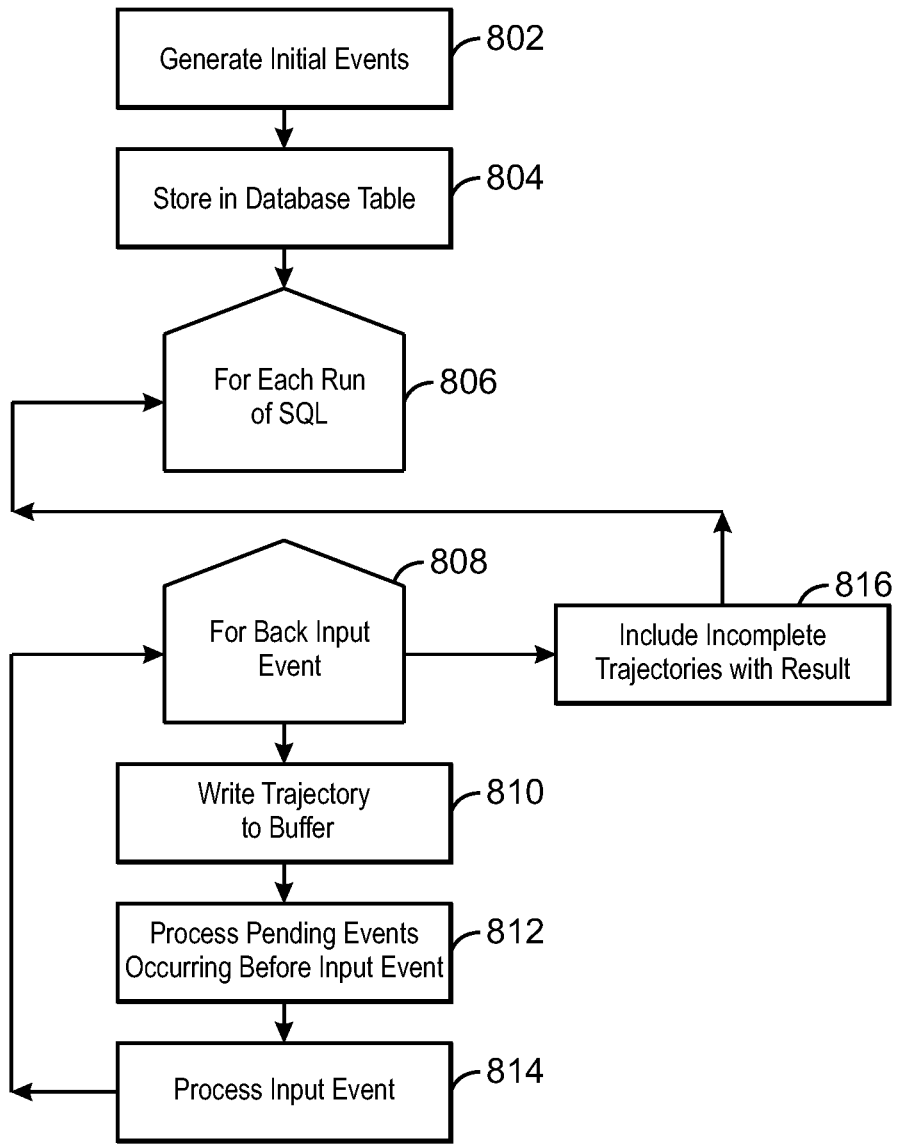
FIG. 8 is a process flow diagram of a method for discrete event simulation using a query, in accordance with an example.

FIG. 8 is a process flow diagram of a method 800 for discrete event simulation using a query, in accordance with an example. It should be understood that the process flow diagram is not intended to indicate a particular order of execution. The method 800 may begin at block 802, where initial events may be generated. A query may invoke the UDF init_evt( ) to generate the initial events. At block 804, the CTRs may be stored in a database table, such as the trajectories 204. The query may include an INSERT SQL statement that invokes the UDF init_evt( ), thereby populating the trajectories 204 with a set of CTRs containing initial arrival events.

Blocks 806-808 may be repeated for each run of the stream simulation query 202. In a run of the stream simulation query, blocks 808-820 may be repeated for each input event. At block 810, the trajectory 204 corresponding to the input event, e.g., CTR, may be written to the buffer 210. At block 812, all pending events that occur before the input event may be processed. Processing includes updating CTRs in the buffer, and the potential generation of pending events. This may involve successive generations of pending events. In other words, the processing of a pending event may result in a newly-generated pending event that also occurs before the input event. Processing may also include removing completed CTRs from the buffer 210. At block 814, the input event may be processed. Any pending events generated by the processing of the input event may be processed in a subsequent run of the stream simulation query. To enable processing in the next run, at block 816, any incomplete CTRs, are included in the result.

Figure 9:
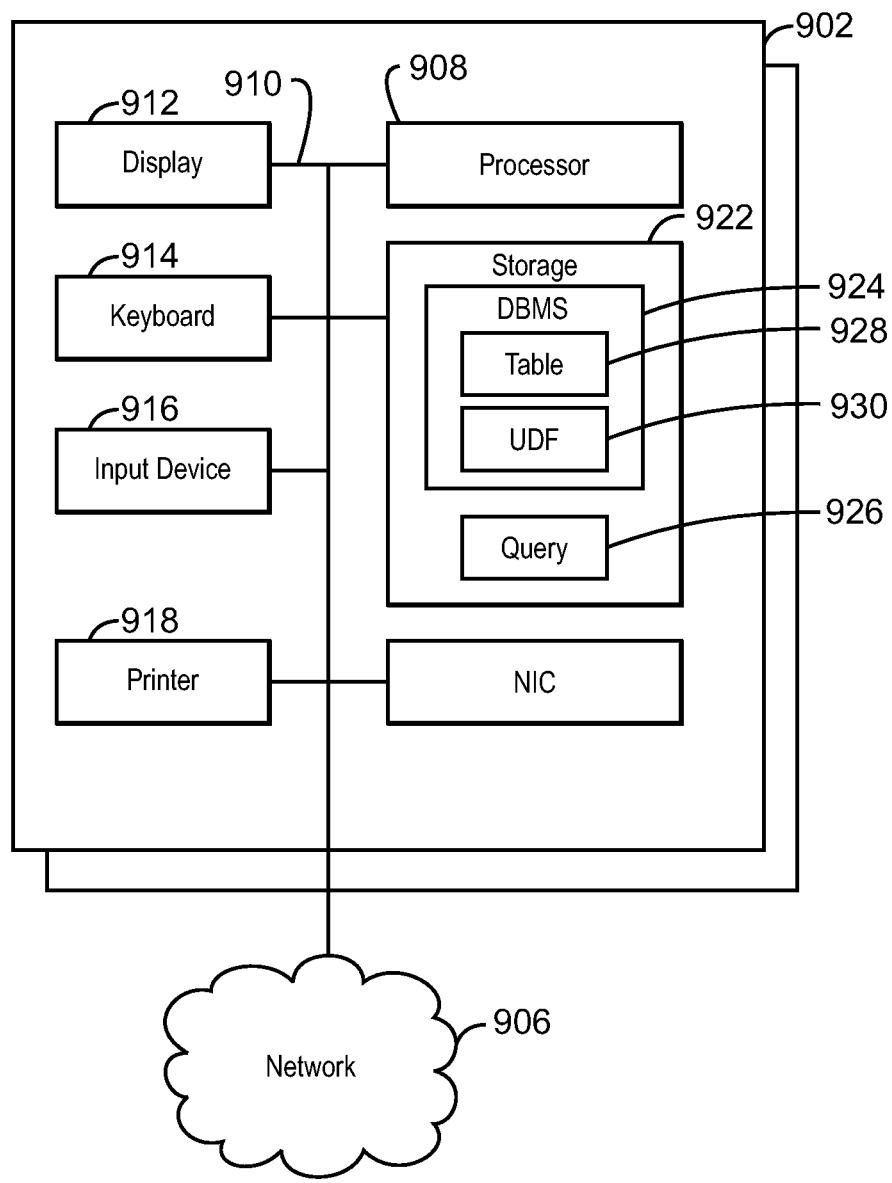
FIG. 9 is a block diagram of a system for generating discrete event simulation data in accordance with an example.

FIG. 9 is a block diagram of a system 900 for generating discrete event simulation data in accordance with an example. The functional blocks and devices shown in FIG. 9 may comprise hardware elements, software elements, or some combination of software and hardware. The hardware elements may include circuitry. The software elements may include computer code stored as machine-readable instructions on a non-transitory, computer-readable medium. Additionally, the functional blocks and devices of the system 900 are but one example of functional blocks and devices that may be implemented in an example. Specific functional blocks may be defined based on design considerations for a particular electronic device.

The system 900 may include computational nodes 902, in communication over a network 906. Each of the computational nodes 902 may include a processor 908, which may be connected through a bus 910 to a display 912, a keyboard 914, an input device 916, and an output device, such as a printer 918. The input devices 916 may include devices such as a mouse or touch screen. The computational nodes 902 may also be connected through the bus 910 to a network interface card 920. The network interface card 920 may connect the computational nodes 902 to the network 906. The network 906 may be a local area network, a wide area network, such as the Internet, or another network configuration. The network 906 may include routers, switches, modems, or any other kind of interface device used for interconnection. In one example, the network 906 may be the Internet.

The computational nodes 902 may have other units operatively coupled to the processor 912 through the bus 910. These units may include non-transitory, computer-readable storage media, such as storage 922. The storage 922 may include media for the long-term storage of operating software and data, such as hard drives. The storage 922 may also include other types of non-transitory, computer-readable media, such as read-only memory and random access memory. The storage 922 may include the machine readable instructions used in example s of the present techniques. In an example, the storage 922 may include a DBMS 924 and a query 926. The query 926 may be configured to generate discrete event simulation data, for storage in a table 928 of the DBMS 924. The query 926 may invoke one or more UDFs 930 to generate the discrete event simulation data.

Figure 10:
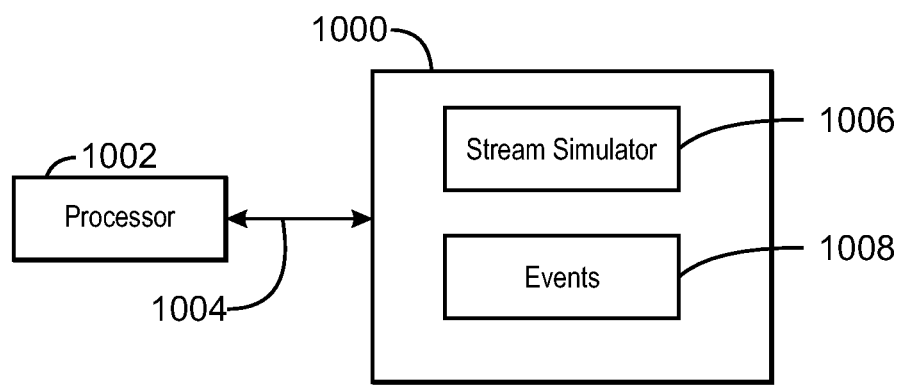
FIG. 10 is a block diagram showing a non-transitory, computer-readable medium that stores code for generating discrete event simulation data in accordance with an example.

FIG. 10 is a block diagram showing a non-transitory, computer-readable medium that stores code for generating discrete event simulation data in accordance with an example. The non-transitory, computer-readable medium is generally referred to by the reference number 1000.

The non-transitory, computer-readable medium 1000 may correspond to any typical storage device that stores computer-implemented instructions, such as programming code or the like. For example, the storage device may include a hard disk drive, a magnetic disk drive, e.g., to read from or write to a removable magnetic disk, and an optical disk drive, e.g., for reading a CD-ROM disk or to read from or write to other optical media. Further, other types of media that are readable by a computer system and that are suitable to the desired end purpose may be used, such as magnetic cassettes, flash memory cards, digital video disks, and the like.

The storage device may be connected to a system bus by a storage device interface, such as a hard disk drive interface, a magnetic disk drive interface, and an optical drive interface. For example, the storage device may be the storage 922 discussed with respect to FIG. 9.

When read and executed by a processor 1002 via a communication path 1004, the instructions stored on the non-transitory, computer-readable medium 1000 are adapted to cause the processor 1002 to process notifications according to an example, as described herein.

The medium 1000 may include a stream simulator 1006 that generates events 1008, which are also included in the medium 1000. The stream simulator 10008 may generate an initial set of events, which may be loaded into a database table. The stream simulator may further retrieve the events from the database table in a relational database query that invokes a user defined function to process the events 1008 serially. The processing of the events 1008 by the UDF generates pending events that are processed prior to the processing of each input event 1008. The relational database query may store the generated pending events in the database table, where they may be re-input to successive runs of the relational database query.

What is claimed is:

1. A method of generating discrete event simulation data, comprising:
   retrieving a trajectory specifying a service access event for a customer accessing a service in a simulation;
   processing, in a relational database query, one or more pending events corresponding to one or more customers accessing the service before the customer;
   processing, in the relational database query, the service access event, wherein processing the service access event occurs after processing the one or more pending events; and
   providing a result for the relational database query, wherein the result comprises the trajectory, and one or more trajectories comprising the one or more pending events.

2. The method recited in claim 1, wherein processing the service access event comprises:
   updating the trajectory based on the service access event;
   generating an additional pending event for another service.

3. The method recited in claim 2, wherein an updated trajectory specifies:
   an arrival time at the service; and
   a departure time from the service.

4. The method recited in claim 1, comprising generating a plurality of rows in a database table comprising:
   the trajectory, and
   one or more trajectories corresponding to the one or more customers.

5. The method recited in claim 4, comprising updating the database table based on the result.

6. The method recited in claim 5, wherein the relational database query invokes a user defined function (UDF) that buffers the one or more pending events, and the trajectories.

7. The method recited in claim 6, wherein the relational database query is a structured query language (SQL) query, and wherein the SQL query comprises SELECT evolve(t.ctr, 1000) FROM (SELECT * FROM table ORDER BY ctr.time) t WHERE t.ctr.time>0, wherein the evolve( )comprises the UDF, the table comprises the database table, and the t.ctr comprises the trajectories.

8. The method recited in claim 1, wherein the relational database query is re-run until the simulation is complete.

9. A computer system for generating discrete event simulation data, comprising:
   a memory storing instructions;
   a processor configured to execute the instructions to:
   retrieve a trajectory specifying a service access event for a customer accessing a service in a simulation;
   process, in a relational database query, one or more pending events corresponding to one or more customers accessing the service before the customer;
   process, in the relational database query, the service access event, wherein processing the service access event occurs after processing the one or more pending events; and
   provide a result for the relational database query, wherein the result comprises the trajectory, and one or more trajectories comprising the one or more pending events.

10. The computer system recited in claim 9, wherein the processor is configured to execute the instructions to process the service access event by executing instructions to:
    update the trajectory based on the service access event;
    generate an additional pending event for another service.

11. The computer system recited in claim 9, wherein an updated trajectory specifies:
    an arrival time at the service; and
    a departure time from the service.

12. The computer system recited in claim 9, wherein the processor is configured to execute the instructions to generate a plurality of rows in a database table comprising:
    the trajectory, and
    one or more trajectories corresponding to the one or more customers.

13. The computer system recited in claim 12, wherein the processor is configured to execute the instructions to update the database table based on the result.

14. The computer system recited in claim 13, wherein the relational database query invokes a user defined function (UDF) that buffers the one or more pending events, and the trajectories.

15. The computer system recited in claim 14, wherein the relational database query is a structured query language (SQL) query, and wherein the SQL query comprises SELECT evolve(t.ctr, 1000) FROM (SELECT * FROM table ORDER BY ctr.time) t WHERE t.ctr.time>0, wherein the evolve( )comprises the UDF, the table comprise the database table, and the t.ctr comprises the trajectories.

16. The computer system recited in claim 9, wherein the relational database query is re-run until the simulation is complete.

17. A non-transitory, computer-readable medium comprising machine-readable instructions executable by a processor to:
    retrieve a trajectory specifying a service access event for a customer accessing a service in a simulation;
    process, in a relational database query, one or more pending events corresponding to one or more customers accessing the service before the customer;
    process, in the relational database query, the service access event, wherein processing the service access event occurs after processing the one or more pending events; and
    provide a result for the relational database query, wherein the result comprises the trajectory, and one or more trajectories comprising the one or more pending events, wherein the relational database query is re-run until the simulation is complete.

18. The non-transitory, computer-readable medium recited in claim 17, wherein the machine-readable instructions which, when executed by the processor, cause the processor to process the service access event comprise machine-readable instructions which, when executed by the processor, cause the processor to:
  update the trajectory based on the service access event;
  generate an additional pending event for another service.

19. The non-transitory, computer-readable medium recited in claim 17, wherein the machine-readable instructions, when executed by the processor, cause the processor to generate a plurality of rows in a database table comprising:
  the trajectory, and
  one or more trajectories corresponding to the one or more customers.

20. The non-transitory, computer-readable medium recited in claim 19, wherein the machine-readable instructions, when executed by the processor, cause the processor to update the database table based on the result.

* * * * *

UNITED STATES PATENT AND TRADEMARK OFFICE
CERTIFICATE OF CORRECTION

| | | |
|---|---|---|
| PATENT NO. | : 8,751,205 B2 | Page 1 of 1 |
| APPLICATION NO. | : 13/172553 | |
| DATED | : June 10, 2014 | |
| INVENTOR(S) | : Meichun Hsu et al. | |

It is certified that error appears in the above-identified patent and that said Letters Patent is hereby corrected as shown below:

In the Claims

Column 11, line 65, in Claim 7, delete "evolve( )comprises" and insert -- evolve( ) comprises --, therefor.

Column 12, lines 45-46, in Claim 15, delete "evolve( )comprises" and insert -- evolve( ) comprises --, therefor.

Signed and Sealed this
Eleventh Day of November, 2014

Michelle K. Lee
*Deputy Director of the United States Patent and Trademark Office*